United States Patent [19]
Collins et al.

[11] Patent Number: 5,174,255
[45] Date of Patent: Dec. 29, 1992

[54] PORTABLE HAND-HELD BLOWER UNIT

[75] Inventors: Imack L. Collins; David M. Wiseman, both of Shreveport, La.

[73] Assignee: White Consolidated Industries, Inc., Cleveland, Ohio

[21] Appl. No.: 542,438

[22] Filed: Jun. 22, 1990

[51] Int. Cl.$^5$ ............................................. F02N 17/00
[52] U.S. Cl. ................................... 123/179.1; 15/344; 261/64.6
[58] Field of Search ................. 123/403, 198 E, 179.1, 123/179.18, 179.23; 261/64.6, 52; 15/344

[56] References Cited

U.S. PATENT DOCUMENTS

| | | |
|---|---|---|
| 2,982,275 | 5/1961 | Doman et al. ........................ 261/52 |
| 3,823,700 | 7/1974 | Gumtow ............................. 261/64.6 |
| 4,318,203 | 3/1982 | Satoh et al. ........................... 15/344 |
| 4,461,055 | 7/1984 | Zerrer et al. .......................... 15/344 |
| 4,490,309 | 12/1984 | Fujikawa et al. .................. 261/64.6 |
| 4,674,146 | 6/1987 | Tuggle et al. .......................... 15/330 |

Primary Examiner—Noah P. Kamen
Attorney, Agent, or Firm—Hubbard, Thurman, Tucker & Harris

[57] ABSTRACT

A portable, hand-held blower unit is powered by a small internal combustion engine having movable choke and throttle control elements linked to a single adjustment knob. Rotation of the knob between full throttle and full choke positions thereof simultaneously adjusts the engine's throttle and choke settings and maintains predetermined engine start and run positional relationships therebetween. The engine carburetor has mounted thereon a specially designed air intake box which substantially reduces engine air intake noise. In the normal operating position of the unit the engine drive shaft is generally vertically oriented, with the carburetor being secured to the top of the engine and the underside of the air intake box. The lower end of the drive shaft is coaxially secured to the unit's blower fan impeller which is spaced upwardly apart from a pull rope starter pulley rotatably carried by the fan impeller housing. When the starter rope is pulled, a toothed pinion member carried by the starter pulley is moved upwardly into rotationally driving engagement with a central toothed portion of the fan impeller to effect engine starting. Upon starter rope release, the pinion member is automatically moved downwardly out of driving engagement with the fan impeller.

4 Claims, 3 Drawing Sheets

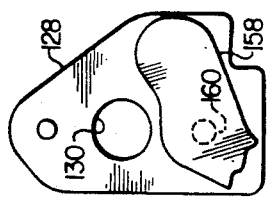
FIG. 7
FIG. 7A
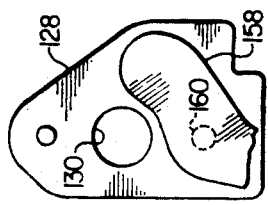
FIG. 6
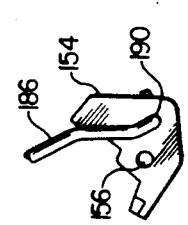
FIG. 6A
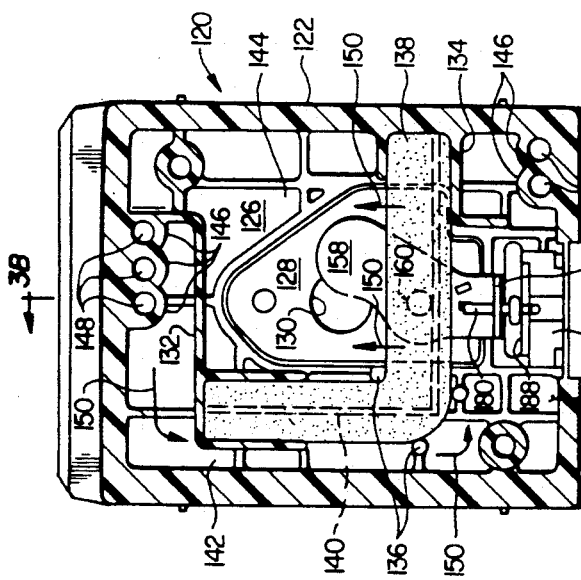
FIG. 3
FIG. 3A
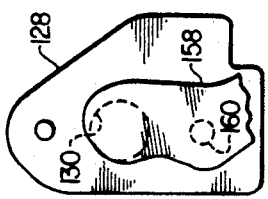
FIG. 5
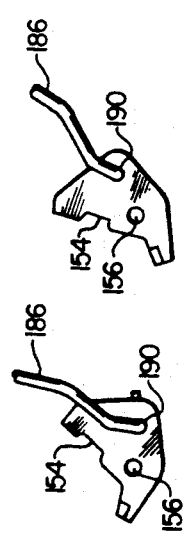
FIG. 5A
FIG. 4A
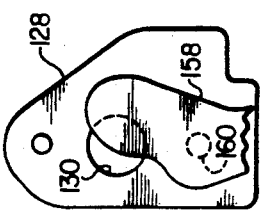
FIG. 4

PORTABLE HAND-HELD BLOWER UNIT

BACKGROUND OF THE INVENTION

The present invention relates generally to portable power tools, and more particularly relates to hand-held portable blower units used, for example, to remove grass clippings, leaves, debris and the like from sidewalks, driveways and other generally horizontal surfaces using a high velocity discharge air stream generated by the unit.

Hand-held gasoline engine-powered blower units of this general type are now quite common and are utilized to blow away a variety of ground debris. The typical unit comprises a hand-held housing secured to an elongated air discharge tube. A small gasoline engine disposed within the housing is used to rotationally drive a fan impeller which draws in ambient air and discharges the air, at a relatively high velocity, through an elongated discharge tube secured to the housing structure. By aiming the discharged air stream at ground disposed debris, such as leaves or grass clippings, a rapid cleanup of sidewalks, driveways and the like may be effected.

A variety of well known problems, limitations and disadvantages are typically associated with conventional hand-held blower units of this general type, including undesirably high weight and bulk, handling difficulties, high engine noise levels, and engine choke/throttle coordination complexities often presented to the unit's operator.

For example, the usual engine, fan impeller and pull-starting system arrangement and configuration typically incorporated in conventional hand-held blower units tends to make them rather heavy and, due to the overall size and bulk of their engine and fan shroud housing, somewhat unwieldy to use. Moreover, the gyroscopic force effects arising during engine operation can render positional control of conventionally configured blower units somewhat difficult.

Conventional hand-held blower units of this general type are typically provided with separate engine throttle and choke controls which are independently adjustable by the unit operator. For each engine operating condition, and particularly during a cold start-up condition, there is a generally optimal relationship between the choke and throttle setting for the particular engine. However, particularly for an inexperienced or unskilled blower unit operator, precise matching of such settings across the full throttle to full choke range of engine operating conditions is often difficult to achieve using the typical independent throttle and choke adjustments.

Finally, while the typical blower unit's engine exhaust noise is conventionally attenuated using an exhaust muffler, it is often the case that the engine's air intake noise remains unacceptably high.

In view of the foregoing, it is accordingly an object of the present invention to provide a hand-held blower unit in which the above-mentioned and other problems, limitations and disadvantages are at least substantially reduced.

SUMMARY OF THE INVENTION

Various aspects of the present invention, by themselves and in combinations with one another, may be utilized to provide an improved hand-held, internal combustion engine-driven blower unit of the type operative to blow away ground-disposed debris, such as leaves, grass clippings or the like. Set forth below are brief summaries of various features of the present invention. The sole purpose of the following summarization is to provide a general overview of the present invention, and is not to be construed as in any manner limiting its nature or scope.

According to one aspect of the invention, a hand-held blower unit of the type mentioned above is driven by a small gasoline engine provided with a single adjustment member which is manually movable to different control positions each corresponding to a different one of various of the engine's operating conditions. The engine's movable throttle and choke members are connected to the single adjustment member by linkage means operative to move the throttle and choke members, in response to movement of the adjustment member from one of its control positions to a selected other one of its control positions, in a manner automatically maintaining a desired correspondence between a set of engine operating conditions and a set of preferred throttle/choke setting relationships at the various engine operating conditions.

The combination throttle/choke adjustment system permits even an inexperienced blower unit operator to properly adjust the engine from its fully choked start-up condition to its full throttle normal run condition in a manner automatically obtaining these throttle/choke relationships. While the combination throttle/choke adjustment system is representatively incorporated in a hand-held blower unit, it will readily be appreciated by those skilled in this art that it could also be incorporated in various other internal combustion engines.

According to another aspect of the present invention, the engine carburetor has secured thereto a specially designed air intake box which substantially reduces air intake noise of the engine during its operation. The intake box is secured atop the carburetor and communicates with the carburetor air intake opening through an opening formed in the bottom of the air intake box. A plurality of elongated air intake passages extend inwardly into the box and communicate with a partitioned air receiving passage within the box, the air receiving passage being partially defined by an air filter element which extends partially around an enclosed filtered air delivery chamber communicating with the carburetor air inlet opening.

During operation of the engine, carburetor intake air is drawn into the intake box through the air inlet passages, enters the partitioned air receiving passage, and is flowed across the air filter element into the enclosed filtered air delivery chamber and flowed into the carburetor. The total volume of the air inlet passages is considerably smaller than the total volume of the air receiving chamber within the air intake box. This feature of the air intake box, coupled with the substantially total isolation of the filtered air delivery chamber from ambient, substantially reduces engine air intake noise compared to conventional blower unit engines. Air intake boxes incorporating these noise attenuation features could, of course, be utilized in conjunction with internal combustion engines in other applications, including in other types of portable power tools such as flexible line trimmers, chain saws and the like.

According to a further feature of the present invention, with the blower unit in its normal operating position, the engine drive shaft is generally vertically oriented and extends downwardly into a fan housing secured to the bottom end of the engine shroud portion of the blower unit. The lower end of the drive shaft is coaxially secured to a centrifugal blower wheel disposed within the fan housing. The bottom side of the fan housing is provided with an air intake grille which rotatably supports a pull rope starter pulley around which an inner longitudinal portion of a starter rope is wound. The outer end of the starter rope is passed outwardly around an exterior roller and is secured to a suitable operator pull handle.

When the start rope is pulled, the pulley is rotated and a rise-up pinion member is caused to move upwardly into engagement with a toothed central hub portion of the fan impeller wheel to thereby rotationally lock the starter pulley to the fan impeller and rotate the drive shaft to effect engine starting. When the pull rope is released, a rewind spring structure associated with the pulley rotates it back to its fully rewound position which causes the pinion structure to downwardly separate from downwardly spaced apart relation with the fan impeller hub.

The configuration and vertically stacked relationship of the engine, the fan impeller, and the starter pulley permits the engine and fan housing portions of the blower unit to be more compact than those in conventional units, and serves to reduce undesirable gyroscopic force effects during blower unit operation. The configuration of these blower unit components also permits an appreciable weight reduction in the unit. As will be readily appreciated by those skilled in this art, this vertically stacked orientation could also be advantageously utilized in blower units driven by electric motors instead of internal combustion engines.

BRIEF DESCRIPTION OF THE DRAWINGS

FIG. 3 is an enlarged scale cross-sectional view through an air intake box portion of the unit, taken along line 3—3 of FIG. 1, with the unit's combination throttle and choke adjustment knob in its "IDLE" position;

FIG. 3A is a side elevational view of the air intake box taken along line 3A—3A of FIG. 3;

FIG. 3B is a cross-sectional view through the air intake box taken along line 3B—3B of FIG. 3;

FIGS. 4 and 4A, respectively, are simplified views of engine choke and throttle elements of the unit illustrating their relative positions when the throttle and choke adjustment knob is rotated to its "HALF CHOKE" position;

FIGS. 5 and 5A, respectively, are simplified views of the choke and throttle elements illustrating their relative positions when the adjustment knob is rotated to its "FULL CHOKE" position;

FIGS. 6 and 6A, respectively, are simplified views of the choke and throttle elements illustrating their relative positions when the adjustment knob is rotated to its "HALF THROTTLE" position; and FIGS. 7 and 7A, respectively, are simplified views of the choke and throttle elements illustrating their relative positions when the adjustment knob is rotated to its "FULL THROTTLE" position.

DETAILED DESCRIPTION

Figure 1:
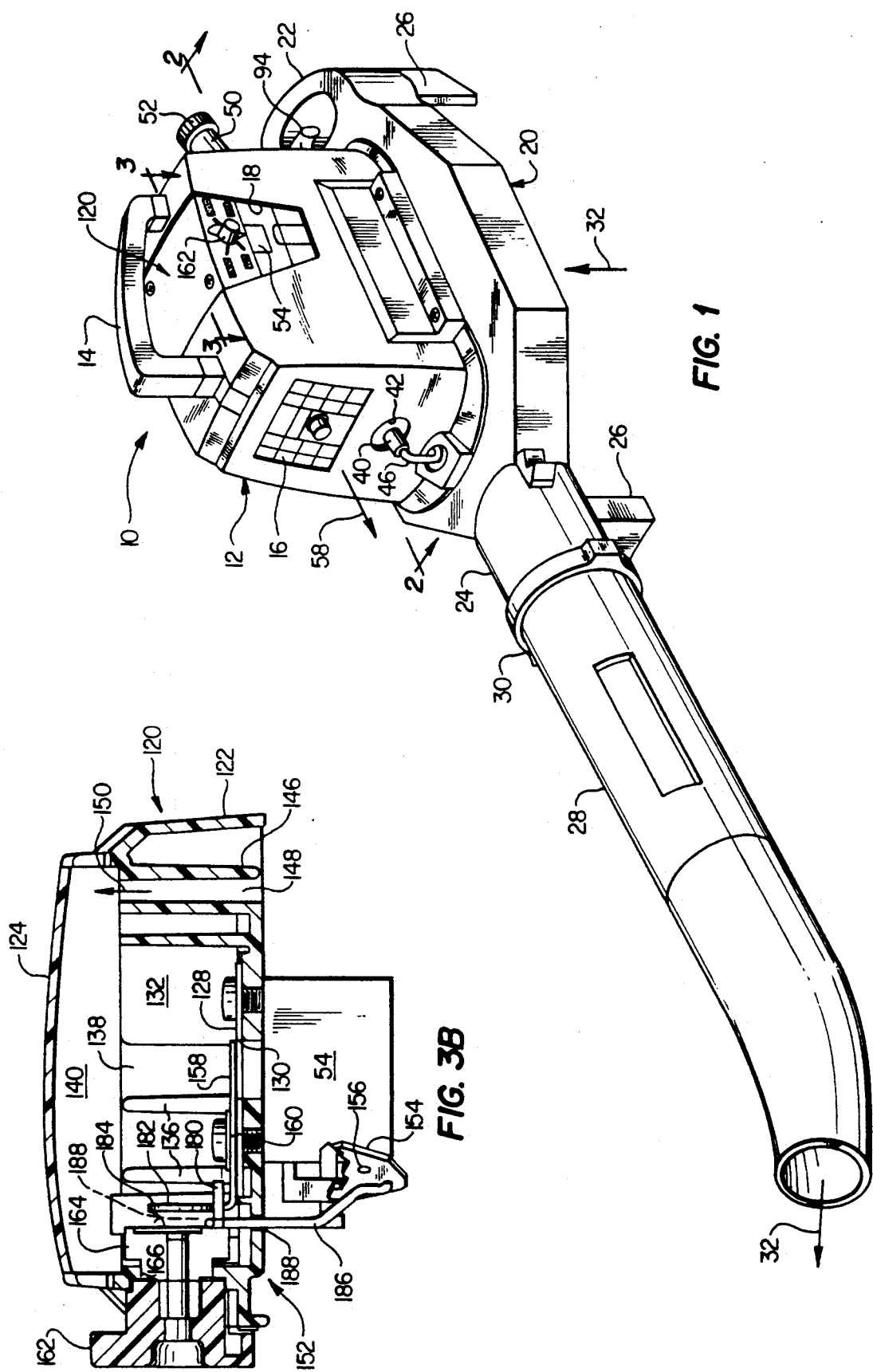
FIG. 1 is a perspective view of a hand-held blower unit which embodies principles of the present invention.
Figure 2:
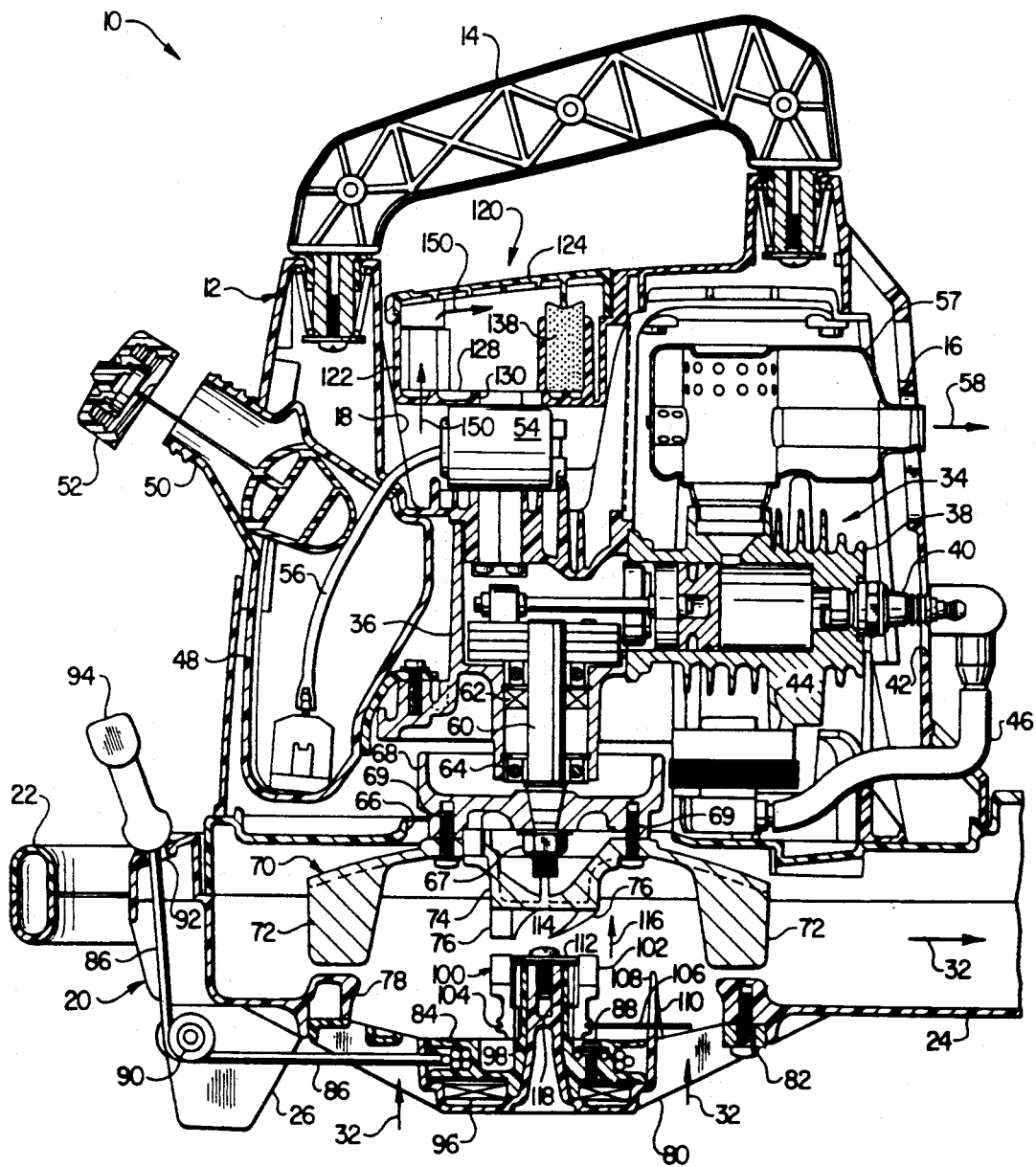
FIG. 2 is an enlarged scale cross-sectional view through the unit taken along line 2—2 of FIG. 1.

Referring initially to FIGS. 1 and 2, various principles of the present invention are representatively incorporated in an improved hand-held blower unit 10 which is utilized to blow away ground disposed debris such as leaves, grass clippings and the like to effect a rapid cleanup of areas such as sidewalks and driveways. Blower unit 10 includes an engine housing or shroud 12 having a top mounted carrying handle 14, an exhaust discharge grille 16 positioned on a top portion of its front side, and an open-sided well area 18 extending downwardly into the housing from its top end. Secured to the bottom end of the engine housing 12 is a fan housing or shroud 20 provided with a rearwardly disposed operator support handle 22, a forwardly disposed tubular discharge portion 24, and depending support legs 26 which may be rested on the ground to hold the fan housing 20 in an elevated position relative thereto. A forwardly projecting discharge tube structure 28 is releasably secured to discharge portion 24 by a suitable coupling structure 30. As subsequently described, during operation of the blower unit 10, ambient air 32 is drawn upwardly into the bottom of the fan housing 20 and is discharged through the open outer end of the tube 28 to effect ground debris cleanup.

Blower unit 10 is powered by a small two stroke cycle gasoline engine 34 (FIG. 2) suitably mounted within the engine housing 12. Engine 34 has a crankcase portion 36 to which a piston and cylinder structure 38 is operatively secured, the piston and cylinder structure 38 being horizontally disposed and positioned between the crankcase 36 and the front side of the engine housing 12 (i.e., its right side as viewed in FIG. 2). Connected to the right end of the piston and cylinder structure 38 is a spark plug 40 that projects outwardly through a suitable opening 42 in the front side of housing 12 and is operatively connected to a magneto 44 by a suitable spark plug wire 46.

A fuel tank 48 is supported within the housing 12 behind the engine 34, and is provided with an external fill neck 50 having a threaded closure cap 52. Fuel from within the tank 48 is supplied to a carburetor 54 by a small fuel supply conduit 56. The carburetor 54 is mounted on the top end of the engine crankcase 36, and is positioned within a bottom end portion of the open-sided housing well 18.

An exhaust muffler 57 is secured to the top side of the piston and cylinder structure 38, and is positioned directly behind the exhaust discharge grille 16 so that during engine operation the engine exhaust 58 is discharged forwardly through the grille 16.

The engine 34 is provided with a crank shaft 60 which, with the blower unit 10 in its usual operating position, is generally vertically disposed. Crank shaft 60 is rotationally supported by crankcase bearing structures 62 and 64 and projects downwardly from the crankcase 36 into the fan housing 24 through a central opening 66 formed in its top side.

As illustrated in FIG. 2, the lower end of the crank shaft 60 is coaxially secured, as by nut 67, to a flywheel 68. In turn, the lower side of flywheel 68 is coaxially secured by screws 69 to a centrifugal fan impeller wheel 70 disposed within the fan housing 20. The fan impeller 70 has a circumferentially spaced series of peripheral vanes 72, and a downwardly projecting central hub portion 74 having a circumferentially spaced series of angled drive teeth 76 formed on its lower end.

The bottom side of the fan housing 20 has a circular opening 78 formed centrally therethrough and positioned directly beneath the fan impeller 70. A circular air inlet grille 80 is secured within opening 78 by a series of retention screws 82, only one of which is visible in FIG. 2. The inlet grille structure 80 centrally and rotatably supports a pull rope starter pulley 84 which is coaxial with and spaced downwardly apart from the fan impeller 70. An inner longitudinal portion of a starter rope 86 is operatively wound around the pulley 84, with the inner end of the rope 86 being locked to the pulley by a screw 88. An outer end portion of the starter rope 86 is passed under a guide roller 90 and then extended upwardly through a grommeted opening 92, formed in an upper rear portion of the fan housing 20, and is secured to a suitable pull handle 94. In the usual fashion, the starter pulley 84 is rotationally biased in a rewind direction by a rewind spring structure 96 operatively associated therewith.

The starter pulley 84 has formed thereon a central, upwardly projecting hub portion 98 having a spiraling external drive thread structure formed thereon. Circumscribing an upper end portion of the pulley hub 98 is a cylindrical, internally threaded clutch member 100 having a circumferentially spaced series of drive teeth 102 formed around its upper end. An annular groove 104 formed around the base of the clutch member 100 slidingly receives a curved inner portion of a guide wire member 106 whose outer end projects radially outwardly from the clutch member 100 and is received within a vertical slot 108 formed in a guide member 110 projecting upwardly from the inlet grille structure 80. An annular stop washer 112 is secured to the upper end of the pulley hub 98 by means of a retention screw 114, the outer diameter of the washer 112 being somewhat less than the interior diameter of the clutch member 100.

With the starter pulley 84 in its fully rewound rotational position, the top end of the pinion member 100 is spaced downwardly apart from the teeth 76 on the lower end of the impeller hub 74. However, when the rope handle 94 is upwardly pulled, the guide wire member 106 operates to cause a relative rotation between the pulley 84 and the pinion member 100 which, due to the threaded interengagement between the pulley hub 98 and the pinion member 100, causes the pinion member 100 to move upwardly, as indicated by the arrow 116, along the pulley hub 98 to bring the pinion member teeth 102 into driving engagement with the impeller hub teeth 76. As the pinion member 100 is moved upwardly in this manner, the guide wire 106 moves upwardly within the guide member slot 108. As the pulley hub teeth 102 are brought upwardly into locking engagement with the impeller hub teeth 76, an interior stop surface 118 within the pinion member 100 is brought into engagement with the underside of the stop washer 112, thereby terminating further relative rotation between the pinion member 100 and the pulley hub 98 and rotationally locking the pinion member 100 to the pulley 84. Accordingly, further outward movement of the pull rope 86 rotationally drives the impeller 70, and thus the drive shaft 60, to effect engine starting.

When the pull handle 94 is released at the end of its starting stroke, the friction created by the spring structure 96 rewinds the starter pulley 84 which, by virtue of the guide wire member 106 interacting with the guide member 110, creates a reverse relative rotation between the pinion member 100 and the pulley hub 98 to downwardly move the pinion member 100 to its initial position and out of engagement with the fan impeller hub teeth 76. In this manner, during operation of the engine 34, the starter pulley 84 is not carried by and rotated by the shaft 60. However, upon a subsequent engine start-up, the rise-up starter pinion structure just described again transmits rotational starting force, via the pull rope 86 and the pulley 84, to the drive shaft 60.

During operation of the engine 34, ambient air 32 is drawn upwardly into the fan housing 20 and is discharged by the rotating impeller 70 outwardly through the tubular exhaust portion 24 and the exhaust discharge tube 28. By aiming the relatively high velocity stream of discharge air 32 at ground disposed debris, such as leaves and grass clippings, a rapid cleanup of such debris may be effected. Also during engine operation, the engine exhaust gas 58 is forwardly discharged from the blower unit 10, thereby conveniently permitting the unit to be positioned on either the right or left side of the unit operator.

The unique configuration and vertically stacked orientation of the engine, fan impeller and pull start structure just described, provides the engine and fan housing portion of the blower unit 10 with a reduced size and weight compared to corresponding engine and fan housing portions of conventional blower units. Such configuration and vertically stacked orientation also appreciably reduces the overall weight of the blower unit 10 compared to such conventional units. Accordingly, compared to conventional units, the blower unit 10 is easier and less tiring to use and control. Additionally, the vertically stacked component orientation of the blower unit 10 materially reduces undesirable gyroscopic forces created by operation of the engine 34, the reduction in such gyroscopic forces further facilitating the handling ease of the unit 10.

Referring now to FIGS. 1-3, according to another feature of the present invention, the air intake noise of the engine 34 is substantially reduced by the use of a specially designed air intake box structure 120 which is positioned within an upper end portion of the open-sided engine housing well 18 immediately above the carburetor 54. The air intake box 120 has a base portion 122 with an open upper end covered by a removable lid 124, and a bottom wall 126 secured to the top end of the carburetor 54. The bottom wall 126 has a choke plate mounting member 128 secured to its upper side surface, the mounting member 128 having a circular opening 130 therein which is aligned with a corresponding opening formed through the bottom wall 126 and positioned above an air intake opening in the upper end of the carburetor 54.

As best illustrated in FIG. 3, the intake box body portion 122 is provided with vertically extending interior partition wall structures 132 and 134, and with upwardly projecting support post members 136, which removably receive and support a foam type air filter element 138 which, as viewed in FIG. 3, has a generally L-shaped cross-section. A downwardly projecting partition wall 140 formed on the underside of the lid 124 cooperates with the wall structures 132 and 134 to define within the intake box body 122 a generally U-shaped air receiving passage 142, extending around a filtered air delivery chamber 144 within which the circular mounting member opening 130 is disposed. The passage 142 and chamber 144 are separated from one another by the wall structures 132, 134, 140 and the air filter element 138 which extends between the wall structures 132 and 134.

Disposed at the opposite ends of the generally U-shaped passage 142 are a plurality of elongated, upwardly projecting air intake tube structures 146 which extend from the bottom wall 26 to just beneath the intake box lid 124. The cylindrical interiors 148 of the tube structures 146 define air inlet passages which extend from the top ends of such structures downwardly through the bottom intake box wall 126 into communication with the open bottom end portion of the engine housing well 18.

During operation of the engine 34, carburetor intake air 150 is drawn upwardly through the vertical inlet passages 148 of the tube structures 146 into the intake box passage 142. Intake air 150 entering the passage 142 is flowed horizontally across the air filter element 138, into chamber 144, and is then flowed downwardly through the opening 130 into the carburetor 54 where it is mixed with fuel delivered via conduit 56 (FIG. 2) to form a fuel/air mixture discharged from the carburetor 54 into the engine crankcase 36.

The total volume of the vertically extending tube inlet passages 148 is quite small relative to the total volume of the intake box passage 142. Importantly, this passage volume relationship has been found to create in the engine 34 a significant reduction in air intake noise. This attenuation is augmented by the substantially total enclosure of the filtered air receiving chamber 144 within the intake air box 120, such enclosure further isolating engine air intake noise from the exterior of the intake air box.

Referring now to FIGS. 3, 3A, and 3B, the present invention also uniquely provides for the engine 34 a combination throttle and choke setting control system which significantly facilitates operator adjustment of engine operating conditions between a full throttle normal operating condition and a fully choked start-up condition. The adjustment system, generally designated by the reference numeral 152, includes a throttle member 154 pivotally secured to the carburetor 54 at point 156, a choke shutter member 158 pivotally secured to the top side of the choke plate mounting member 128, at point 160, for pivotal movement relative thereto about a vertical axis, and a single adjustment knob 162 which is rotationally locked to a cylindrical knob retainer 164 rotatably supported within a side wall opening 166 in the intake box body 122. The knob 162, and the knob retainer 164, are rotatable about a horizontal axis, with the knob 162 projecting outwardly from the intake box 120, and the retainer 164 projecting inwardly into the intake box. As best illustrated in FIG. 3A, the single adjustment knob 162 is provided with a pointer portion 168 which, upon knob rotation, may be aligned with various engine operating condition indicia suitably imprinted upon the knob side of the air intake box body 122. As illustrated in FIG. 3A, such indicia include "FULL THROTTLE" 170, "HALF THROTTLE" 172, "IDLE" 174, "HALF CHOKE" 176, and "FULL CHOKE" 178.

The single adjustment knob 162, in a manner which will be subsequently described, is linked to both the throttle member 154 and the choke shutter member 158 in a manner permitting the knob 162 to be used to simultaneously adjust the throttle member 154 and the choke shutter member 158, between a full throttle normal run condition of the engine and a full choke start-up condition of the engine.

The linkage means which effect this interconnection include a pin member 180 which projects axially inwardly from a peripheral inner side portion of the knob retainer 164 and is received in a vertical slot 182 formed in an upturned end portion 184 of the choke shutter member 158. These linking means also include an elongated throttle actuating rod member 186 that extends vertically through a slot 188 (FIG. 3) formed through the bottom intake box wall, with the upper end of rod 186 being pivotally connected to the knob pin 180, and the lower end of the rod 186 being pivotally connected to the throttle member 154 at point 190.

To demonstrate the simultaneous adjustment of the engine's throttle and choke settings, it will be assumed that the single adjustment knob 162 is in its "IDLE" position shown in FIGS. 3 and 3A. With the knob in the idle position, the rod 186 holds the throttle member 154 in a counterclockwise pivoted position about pivot point 156 to maintain the engine throttle setting at a partially open idling position. The choke shutter member, as depicted in FIG. 3, partially overlies and restricts the circular opening 130 in the choke plate mounting member 128.

When the knob 162 is rotated in a counterclockwise direction to its half-choke position, the pin 180 simultaneously rises within the slot 182 and pivots the choke shutter member 158 in a counterclockwise direction as viewed from the top. The rising of the pin 180 in slot 182 causes the throttle actuating rod 186 to lift as indicated by its representative dotted line position in FIG. 3B. The lifting of the rod 186, and the pivoting of the member 158, further pivots the throttle member 154 in a counterclockwise direction (FIG. 4A) and pivots the choke shutter member 158 in a counterclockwise direction to further restrict the opening 130 (FIG. 4). Accordingly, when the single adjustment knob 162 is moved from its idle position to its half-choke position, the engine 34 is brought to a half-choke, half-throttle position.

Further counterclockwise rotation of the adjustment knob 162 from its half-choke position to its full-choke position causes the throttle member 154 to be further pivoted upwardly to its full-throttle position, and causes the choke shutter member 158 to be pivoted in a counterclockwise direction fully over the opening 130, as illustrated in FIGS. 5 and 5A. This brings the engine 34 to a full throttle/full choke operating condition for start-up purposes.

Referring now to FIGS. 6 and 6A, when the adjustment knob 162 is pivoted in a clockwise direction from its idle position to its half-throttle position, the choke shutter member 158 is pivoted in a clockwise direction, from its idle position shown in FIG. 3, to fully uncover the air inlet opening 130 (FIG. 6), and the throttle member 154 (FIG. 6A) is pivoted in a counterclockwise direction away from its FIG. 3A idle position to its half-throttle position (FIG. 6A). Accordingly, with the knob 162 in its half-throttle, the engine 34 is brought to a half-throttle, unchoked operating condition.

Finally, when the single adjustment knob 162 is rotated in a clockwise direction from its half-throttle position to its full throttle position, the choke shutter member 158 (FIG. 7) is pivoted in a clockwise direction further away from its FIG. 6 position, and the throttle member 154 (FIG. 7A) is further pivoted in a counterclockwise direction from its FIG. 6A to its full throttle position, thereby bringing the engine 34 to its full-throttle, non-choked normal run condition.

It can be seen from the foregoing that the throttle/choke adjustment system 152 of the present invention permits even an inexperienced or unskilled operator of the blower unit 10 to readily bring the engine 34 to any of the five indicated engine operating conditions, without the previous necessity of individually adjusting separate choke and throttle knobs or levers, while at the same time automatically maintaining a predetermined preferred correspondence between these five engine operating conditions and the engine's generally optimum throttle/choke settings at such conditions. As will readily be appreciated by those skilled in this particular art, a variety of other throttle/choke setting relationships could readily be established at the various selected engine operating conditions simply by, for example, changing the orientation of the slot 182 in the upturned end portion 184 of the choke shutter member 158, or making other configurational variations in the linkage means which interconnect the single adjustment knob 162 to the throttle and choke members 154 and 158.

The foregoing detailed description is to be clearly understood as being given by way of illustration and example only, the spirit and scope of the present invention being limited solely by the appended claims.

What is claimed is:

1. In an internal combustion engine have a throttle member movable to adjust the throttle setting of the engine, said throttle member being pivotable about a first axis, a choke member movable to adjust the choke setting of the engine, said choke member being pivotable about a second axis, a set of engine operating conditions ranging between a full throttle normal operating condition and a full choke start-up condition, and a predetermined preferred set of throttle/choke setting relationships corresponding to the engine operating conditions in said set thereof, throttle and choke adjustment apparatus comprising:

a single adjustment member manually movable to different control positions each corresponding to a different one of said engine operating conditions, said single adjustment member being rotatably about a third axis generally transverse to said second axis; and linkage means connecting said throttle member and said choke member to said single adjustment member, for moving said throttle choke members, in response to movement of said single adjustment member from one of said control positions to a selected other one of said control positions, in a manner automatically maintaining the desired correspondence between said set of engine operating conditions and said set of throttle/choke setting relationships, said linkage means including;

a first linkage member carried by said single adjustment member and being rotatable thereby through an arc centered about said third axis, said first linkage member being engaged with said choke member in a manner causing said first linkage member to pivot said coke member about said second axis and be translated relative to said choke member in response to rotation of said single adjustment member about said third axis, and a second linkage member having a first position pivotally connected to said first linkage member, and a second portion pivotally connected to said throttle member at a point thereon spaced laterally apart from said third axis, said second linkage member being translatable, in response to movement of said first linkage member about said axis, to pivot said throttle member about said first axis.

2. The throttle and choke adjustment apparatus of claim 1 wherein:

said choke member has a slot formed therein, and said first linkage member is received in said slot for movement along its length.

3. A hand-held portable power tool comprising:

internal combustion engine means for supplying rotational power, said internal combustion engine means having:

a throttle setting, a choke setting, a carburetor with an air inlet opening, and an air intake housing secured to said carburetor over said air inlet opening and adapted to receive an inlet flow of air and deliver the received air into said air inlet opening, a set of engine operating conditions ranging between a full throttle normal operating condition and a full choke start-up condition, and a predetermined preferred set of throttle/choke setting relationships corresponding to the engine operating conditions in said set thereof;

a driven member drivable through a work producing movement;

power transfer means for utilizing said rotational power to impart said work producing movement to said driven member;

a throttle member pivotally secured to said carburetor externally of said air intake housing and movable to selectively adjust said throttle setting;

a choke member pivotally mounted within said air intake housing and movable to selectively adjust said choke setting;

a single adjustment member rotatably mounted on said air intake housing manually movable to different control positions each corresponding to a different one of said engine operation conditions; and linkage means, connecting said throttle member and said choke member to said single adjustment member, for moving said throttle and choke members, in response to movement of said single adjustment member from one of said control positions to a selected other one of said control positions, in a manner automatically maintaining the desired correspondence between said set of engine operating conditions and said set of throttle/choke setting relationships.

4. The power tool of claim 3 wherein:

said power tool is a blower unit, and said driven member is a centrifugal fan impeller rotationally drivable by said internal combustion engine means.

* * * * *

UNITED STATES PATENT AND TRADEMARK OFFICE
CERTIFICATE OF CORRECTION

PATENT NO. : 5,174,255
DATED : December 29, 1992
INVENTOR(S) : Imack L. Collins, et al.

It is certified that error appears in the above-identified patent and that said Letters Patent is hereby corrected as shown below:

Column 9, line 35, delete "rotatably" and insert -- rotatable --.

Column 9, line 40, delete "throttle choke" and insert -- throttle and choke --.

Column 9, line 58, delete "position" and insert -- portion --.

Column 10, line 5, delete "said axis" and insert -- said second axis --.

Column 10, line 6, delete "first" and insert -- third --.

Column 10, line 44, delete "operation" and insert -- operating --.

Signed and Sealed this

Sixteenth Day of November, 1993

Attest:

BRUCE LEHMAN

*Attesting Officer*   Commissioner of Patents and Trademarks